US006499576B2

(12) United States Patent
Wafler

(10) Patent No.: US 6,499,576 B2
(45) Date of Patent: Dec. 31, 2002

(54) DUAL GEAR TRAIN FOR INK JET PRINTER

(75) Inventor: Walter F. Wafler, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 35 days.

(21) Appl. No.: 09/749,578

(22) Filed: Dec. 28, 2000

(65) Prior Publication Data

US 2002/0084161 A1 Jul. 4, 2002

(51) Int. Cl.[7] .................... F16D 41/04

(52) U.S. Cl. .................... 192/48.92; 192/48.91; 192/41 R; 400/582; 74/810.1

(58) Field of Search .................... 192/41 R, 48.92, 192/48.8, 48.9; 74/810.1, 89.16, 89.2, 421 R, 421 A; 400/582

(56) References Cited

U.S. PATENT DOCUMENTS 3,517,574 A * 6/1970 Glatfelter .................... 173/170
4,501,169 A * 2/1985 Stilin .................... 192/48.92
4,638,337 A 1/1987 Torpey et al.
4,849,774 A 7/1989 Endo et al.
5,159,854 A * 11/1992 Mino et al. .................... 74/810.1
5,361,217 A 11/1994 Makimura et al. .................... 364/561
5,503,586 A * 4/1996 Suto .................... 446/443
5,769,748 A * 6/1998 Eyerly et al. .................... 475/5
5,967,677 A 10/1999 McCue et al. .................... 400/582
6,036,174 A * 3/2000 Andersen .................... 254/343
6,041,990 A * 3/2000 Chang .................... 226/144
6,353,957 B1 * 3/2002 Wolfe et al. .................... 15/49.1

* cited by examiner

*Primary Examiner*—Saul Rodriguez
(74) *Attorney, Agent, or Firm*—Oliff & Berridge, PLC

(57) ABSTRACT

A stepping mechanism comprising a motor, a motor gear connectable to the motor and rotatable by the motor, a first one-way clutch and a second one-way clutch when the motor rotates the gear in a first direction so as to operate the first one-way clutch in a first mode and the motor rotates the gear in the second direction so as to operate the second one-way clutch in a second mode, wherein the first and second one-way clutch do not operate at the same time.

1 Claim, 3 Drawing Sheets

DUAL GEAR TRAIN FOR INK JET PRINTER

BACKGROUND OF THE INVENTION

1. Field of Invention

This invention relates to a fluid ejection printing apparatus.

2. Description of Related Art

Fluid ejection systems, such as ink jet printers, have at least one fluid ejection head that directs droplets of fluid towards a recording medium. Within the fluid ejection head, the fluid may be contained in a plurality of channels. Energy pulses are used to expel the droplets of fluid, as required, from orifices at the ends of the channels.

In a thermal fluid ejection system, such as a thermal ink jet printer, the energy pulses are usually produced using resistors. Each resistor is located in a respective one of the channels, and is individually addressable by voltage and/or current pulses to heat and vaporize the fluid in the channels. As a vapor bubble grows in any one of the channels, fluid bulges from the channel orifice until the pulse has ceased and the bubble begins to collapse. At that stage, the fluid within the channel retracts and separates from the bulging fluid to form a droplet moving in a direction away from the channel and towards the receiving medium. The channel is then re-filled by capillary action, which in turn draws fluid from a supply container. Operation of a thermal ink jet printer is described in, for example, U.S. Pat. No. 4,849,774, incorporated herein by reference in its entirety.

A carriage-type thermal ink jet printer is described in U.S. Pat. No. 4,638,337, incorporated herein by reference in its entirety. That thermal ink jet printer has a plurality of printheads, each with its own ink tank cartridge, mounted on a reciprocating carriage. The channel orifices in each printhead are aligned perpendicular to the line of movement of the carriage. A swath of information is printed on the stationary receiving medium as the carriage is moved in one direction. The receiving medium is then stepped, perpendicular to the line of carriage movement, by a distance equal to or less than the width of the printed swath. The carriage is then moved in the reverse direction to print another swath of information.

SUMMARY OF THE INVENTION

Some fluid ejection systems, such as low cost ink jet printers, have paper advance subsystems that must operate on two opposing modes. The first mode is a high speed mode which maximizes the throughput of the receiving medium. The second mode is a high precision mode to accurately register the receiving medium.

Typically, a single motor with a single clutch and a single gear train is used to implement both the high speed mode and the high precision mode. The single motor is connected to the clutch and the gear train. The clutch and the gear train are also connected to a shaft with rollers. When the motor is activated, the rotational force of the motor is transferred through the clutch to the gear train. The gear train then transfers the rotational force to the shaft and roller. As the rollers rotate, the rollers advance the receiving medium.

However, a single clutch and a single gear train, when used to implement as both the high speed mode and the high precision mode, fail to accurately advance the paper. In particular, when a high precision mode is requested, the single clutch and gear train cannot accurately register the receiving medium.

This invention provides a receiving medium advancing mechanism having both a high speed subsystem and a high precision subsystem implemented using a simple low cost motor.

The invention separately provides two gear trains and two one-way clutches to provide two types of motion from a single motor.

In various exemplary embodiments of systems and methods according to this invention, a receiving medium advancing mechanism comprises a motor, a gear, a first one-way clutch and a second one-way clutch. When the motor rotates the gear in a first direction, the first one-way clutch, but not the second one-way clutch, is operated to advance the receiving medium in a first mode. When the motor rotates the gear in a second direction, the second one-way clutch, but not the first one way clutch, is operated to advance the receiving medium in a second mode. The first mode is a high advance mode while the second mode is high precision mode.

These and other features and advantages of this invention are described in or apparent from the detailed description of various exemplary embodiments of the systems and methods according to this invention.

BRIEF DESCRIPTION OF THE DRAWINGS

Various exemplary embodiments of the invention will be described in detail with reference to the following figures, wherein like numerals represent like elements, and wherein.

DETAILED DESCRIPTION OF EXEMPLARY EMBODIMENTS

The following detailed description of various exemplary embodiments of the fluid ejection systems according to this invention are directed to one specific type of fluid ejection system, an ink jet printer, for sake of clarity and familiarity. However, it should be appreciated that the principles of this invention, as outlined and/or discussed below, can be equally applied to any known or later-developed fluid ejection systems, beyond the ink jet printer specifically discussed herein.

Figure 1:
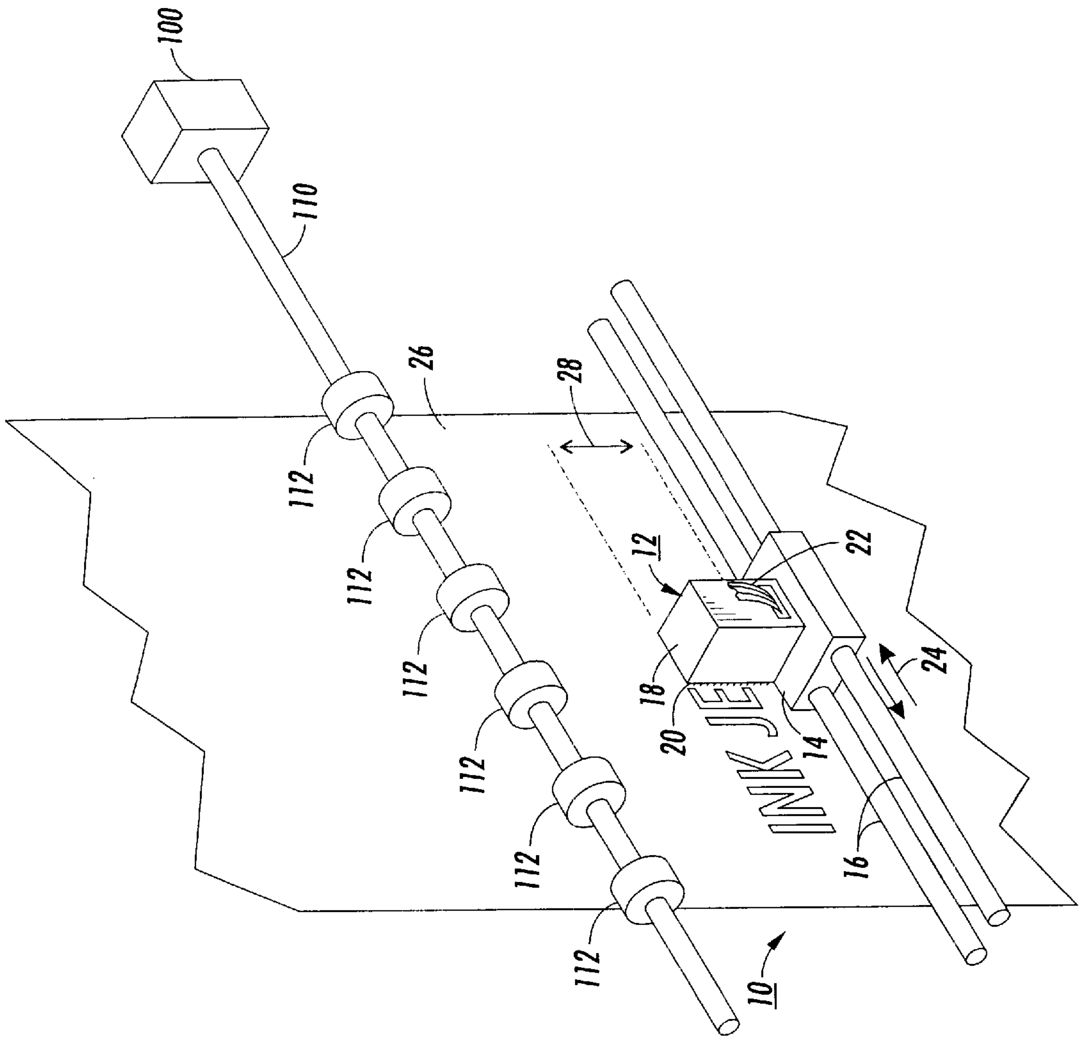
FIG. 1 is a schematic view of a fluid ejection system and a receiving medium advancing mechanism according to this invention.

FIG. 1 illustrates a partial perspective view of an ink jet printer 10 having an ink jet printhead cartridge 12 mounted on a carriage 14 supported by a carriage rail 16. The printhead cartridge 12 includes a housing 18 containing ink that is supplied to a thermal ink jet printhead 20. The thermal ink jet printhead 20 selectively expels droplets of ink under control of electrical signals received from a controller of the printer 10 through an electrical cable 22. The printhead 20 contains a plurality of ink channels which carry ink from the housing to respective ink ejectors, such as orifices or nozzles.

When printing, the carriage 14 reciprocates or scans back and forth along the carriage rail 16 in a fast scan direction, as indicated by an arrow 24. As the printhead cartridge 12 reciprocates back and forth across a receiving medium 26, such as a sheet of paper or a transparency, in the fast scan direction 24, droplets of ink are expelled from selected ones of the printhead nozzles toward the receiving medium 26. The ink ejecting orifices or nozzles are typically arranged in a linear array perpendicular to the fast scan direction 24.

During each pass of the carriage 14, the receiving medium 26 is held in a stationary position. At the end of each pass, however, the receiving medium 26 is stepped by a receiving medium advancing mechanism 100 under control of the controller in a process or slow scan direction, as indicated by an arrow 28. The receiving medium advancing mechanism 100 rotates a shaft 110, and a number of attached transport rollers 112. The transport rollers 112 contact the receiving medium 26, and move the receiving medium 26 in the direction of the arrow 28.

Figure 2:
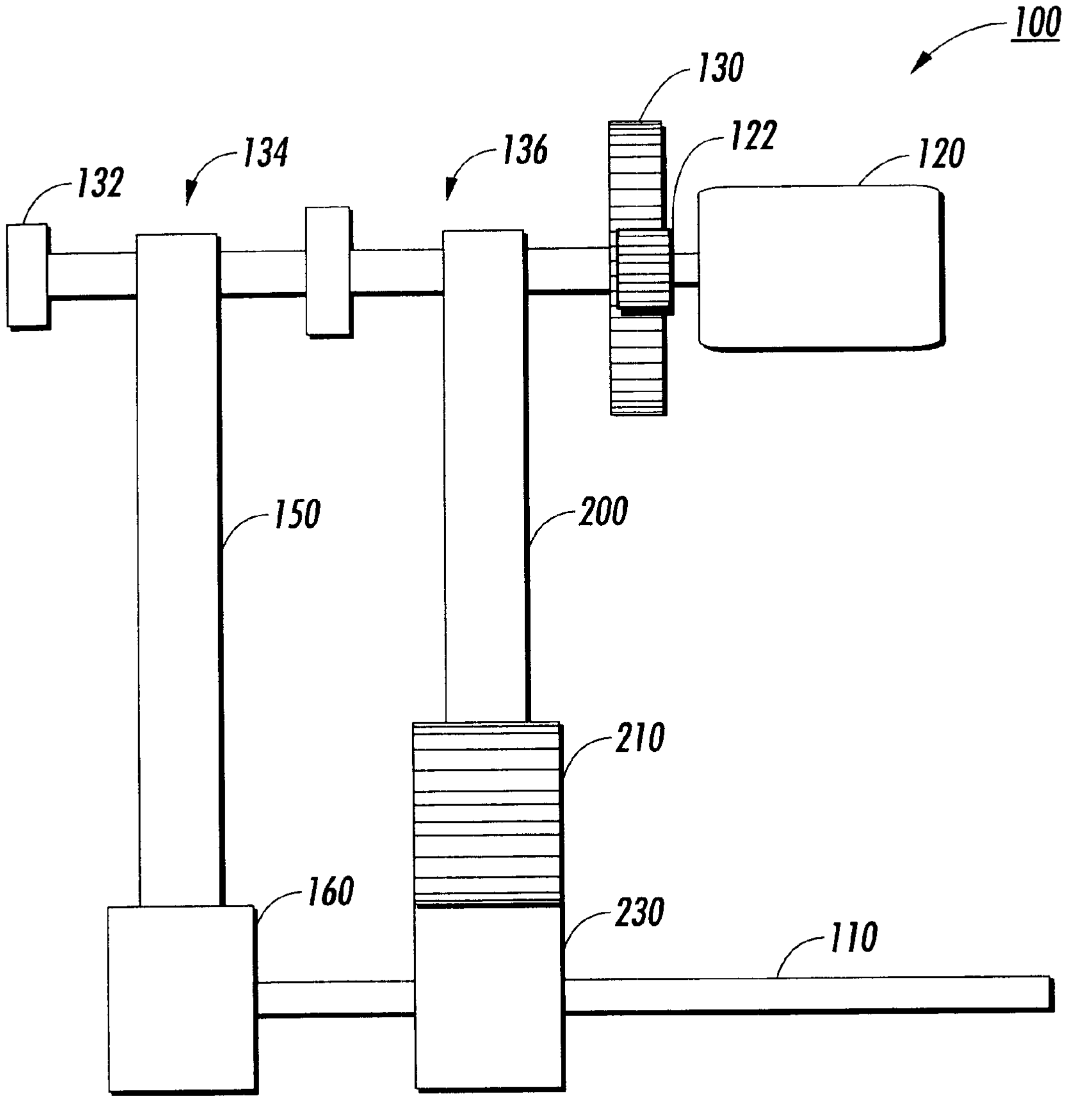
FIG. 2 is an exemplary embodiment of the receiving medium advancing mechanism according to this invention.
Figure 4:
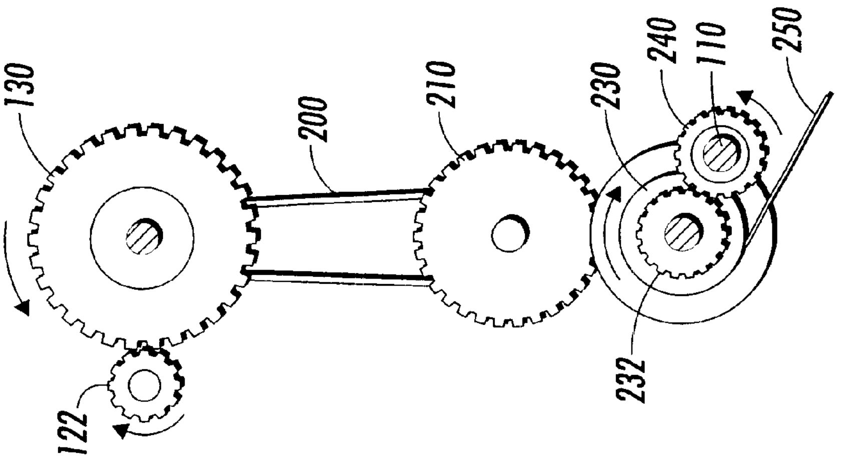
FIG. 4 is a schematic diagram of the receiving medium advancing mechanism according to this invention that advances the receiving medium at a high precision.
Figure 3:
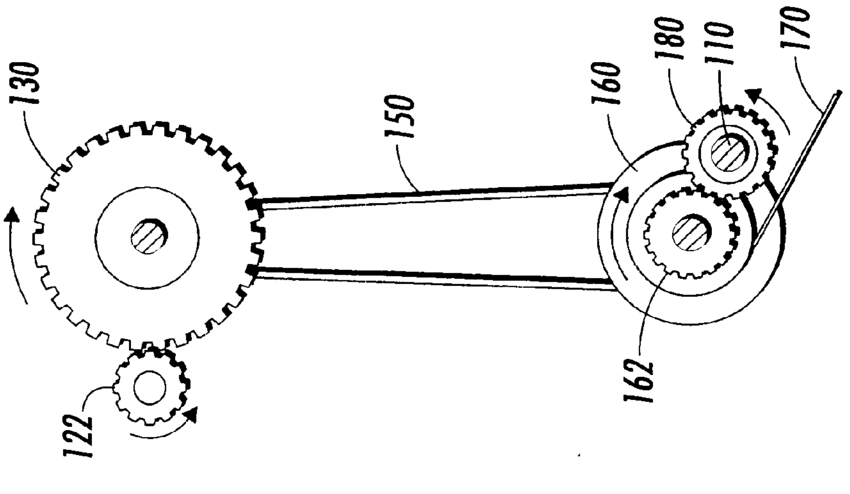
FIG. 3 is a schematic diagram of the receiving medium advancing mechanism according to this invention that advances the receiving medium at a high speed.

FIGS. 2–4 show one exemplary embodiment of the receiving medium advancing mechanism 100 according to this invention used to drive the shaft 110. The receiving medium advancing mechanism 100 includes a motor 120. The motor 120 bi-directionally drives a drive gear 122. The drive gear 122 is engaged with a pitch gear 130. As should be appreciated, the drive gear 122 and pitch gear 130 can have any given number of teeth. The drive gear 122 can rotate the pitch gear 130 in both a clockwise direction and a counterclockwise direction.

As shown in FIG. 2, the pitch gear 130 is attached to a pitch pulley 132. The pitch pulley 132 includes a front track 134 and a rear track 136. A first drive belt 150 is engaged to the front track 134. A second drive belt 200 is engaged to the rear track 136. As should be appreciated, as the pitch gear 130 rotates the pitch pulley 132, the front track 134 rotates drive belt 150 and the rear track 136 rotates drive belt 200.

FIG. 3 shows a first subsystem for moving the receiving medium 26 in a first mode. FIG. 4 shows a second subsystem for moving the receiving medium 26 in a second mode. In various exemplary embodiments, the first subsystem is used as the high speed advance subsystem while the second subsystem is used as the high precision subsystem. Thus, in this exemplary embodiment, the first mode is a high advance mode and the second mode is a high precision mode. However, it should be appreciated that the first subsystem can be the high precision subsystem and the second subsystem can be the high advance subsystem.

As shown in FIGS. 2 and 3, as the drive belt 150 rotates in a first direction, the drive belt 150 drives a first one-way clutch 160. The first one-way clutch 160 is designed to rotate only when the drive belt 150 is driven in a first direction. As shown in FIG. 3, the clutch 160 is connected to a gear 162. In contrast, as shown in FIGS. 2 and 4 as the drive belt 200 rotates in the second direction, the drive belt 200 drives the gear 210. As shown in FIG. 4, the gear 210 is connected to a second one way clutch 230. The second one-way clutch 230 is designed to rotate only when the gear 210 is driven in the second direction. The gear 210 is driven in the second direction only when the drive belt 200 is driven in the second direction.

When the first one-way clutch 160 rotates in the first direction, the first one-way clutch 160 drivingly engages the gear 162. In response, the gear 162 also rotates in the first direction and drives a gear 180, which rotates in a second direction. The gear 180 is attached to the shaft 110. As the gear 180 rotates in the second direction, the shaft 110 rotates in the second direction. As the shaft 110 rotates in the second direction, the rollers 112 also rotate in the second direction. The rollers 112 thus contact the receiving medium 26, and move the receiving medium 26 in the direction of the arrow 28.

As should be appreciated, the receiving medium advancing mechanism 100 rotates the rollers 112 in the second direction when the receiving medium advancing mechanism 100 is located at the right hand side of the receiving medium 26 as shown in FIG. 1. However, the receiving medium advancing mechanism 100 needs to rotate the rollers 112 in the first direction when the receiving medium advancing mechanism is located at the left hand side of the receiving medium 26. In this case, the rotational directions of the one-way clutch 160 and the gear 180 can be reversed or an additional gear added between the one-way clutch 160 and the shaft 110 or between the drive belt 150 and the one-way clutch 160.

As should be appreciated, as the drive gear 122 rotates in the first or second direction, the drive gear 122 rotates the pitch gear 130 in the second or first direction, respectively. As the pitch gear 130 rotates in the first or second direction, the front track 134 rotates the drive belt 150 in the first or second direction, respectively. As the drive belt 150 rotates in the first direction, the drive belt 150 drives the first one-way clutch 160 in the first direction. The first one-way clutch 160 then drivingly engages the gear 162 to rotate in the first direction, which in turn drives the gear 180 in the second direction. As the gear 180 rotates in the second direction, the shaft 110 rotates in the second direction. As the shaft 110 rotates in the second direction, the rollers 112 also rotate in the second direction. The rollers 112 thus contact the receiving medium 26, and move the receiving medium 26 in the direction of the arrow 28.

In contrast, as the pitch gear 130 rotates in the second direction, the front track 130 rotates the drive belt 150 in the second direction. However, the first one-way clutch 160 is stopped from being driven by the drive belt 150 in the second direction by a stopper 170. Thus, as should be appreciated, when the first one-way clutch 160 is stopped by the stopper 170, the first one-way clutch 160 is disengaged from the drive belt 150 so that the drive belt 150 is stopped from driving the first one-way clutch 160. The first one-way clutch 160 is also disengaged from the gear 162 so that the gear 162 rotates freely without being driven by the first one-way clutch 160.

As shown in FIG. 4, the clutch 230 is connected to the gear 232. When the second one-way clutch 230 is driven by the gear 210 to rotate in the first direction, the second one-way clutch 230 drives the gear 232. In response, the gear 232 drives a gear 240 in the second direction. The gear 240 is attached to the shaft 110. As the gear 240 rotates in the second direction, the shaft 110 rotates in the second direction. As the shaft 110 rotates in the second direction, the rollers 112 also rotate in the second direction. The rollers 112 thus contact the receiving medium 26, and move the receiving medium 26 in the direction of the arrow 28.

As should be appreciated, as the drive gear 122 rotates in the first or second direction, the drive gear 122 rotates the pitch gear 130 in the second or first direction, respectively. As the pitch gear 130 rotates in the second direction, the rear track 136 rotates the drive belt 200 in the second direction. As the drive belt 200 rotates in the second direction, the gear 210 rotates in the second direction. As the gear 210 rotates in the second direction, the gear 210 drivingly engages the second one-way clutch 230 to rotate in the first direction. The second one-way clutch 230 then drivingly engages the gear 232 to rotate in the first direction, which in turn drives the gear 240 in the second direction. As the gear 240 rotates in the second direction, the gear 240 rotates the shaft 110 in the second direction. As the shaft 110 rotates in the second direction, the rollers 112 also rotate in the second direction.

The rollers 112 thus contact the receiving medium 26, and move the receiving medium 26 in the direction of the arrow 28.

In contrast, as the pitch gear 130 rotates in the first direction, the rear track 136 rotates the drive belt 200 in the first direction. The drive belt 200 then rotates the gear 210 in the first direction. However, the second one-way clutch 230 is stopped from being driven by the gear 210 in the second direction by a stopper 250. Thus, as should be appreciated when the second one-way clutch 230 is stopped by the stopper 250, the second one-way clutch 230 is disengaged from the gear 210 so that the gear 210 is stopped from driving the second one-way clutch 230. The clutch 230 is also disengaged from the gear 232, so that the gear 232 rotates freely without being driven by the second one-way clutch 230.

Thus, as should be appreciated, when the drive gear 122 rotates in the second direction, the gear 180 drives the shaft 110 in the second direction and when the drive gear 122 rotates in the first direction, the gear 240 drives the shaft 110 in the second direction.

When providing a high precision advance subsystem, a gear with a lower number of teeth than the gear which it drives is used to slowly advance the shaft 110. Conversely, when providing a high speed advance subsystem, a gear with a higher number of teeth than the gear which it drives is used to rapidly advance the shaft 110. Thus, as should be appreciated, either the gear 162 or the gear 232 can have a relatively higher number of teeth than the corresponding gear 180 or 240 in order to be used as the high speed advance system, while the other one of the gears 162 or 232 has a lower number of teeth than the corresponding gear 180 or 240 in order to be used as the high precision advance subsystem. In various exemplary embodiments, the gear 162 has a relatively higher number of teeth than the gear 150, while the gear 232 has a relatively lower number of teeth than the gear 240. As the receiving medium 26 approaches the printhead 20, the motor drives the drive gear 122 in the second direction. Thus, the receiving medium 26 is moved rapidly in the direction of the arrow 28. Then, the motor 120 drives the drive gear 122 in the first direction when printing occurs on the receiving medium 26. Thus, the receiving medium 26 is slowly moved in the direction of the arrow 28 in order to accurately place the receiving medium 26 relative to the array of nozzles on the printhead 20. Once all of the image data to be placed on the receiving medium 26 has been placed on the receiving medium 26, the motor 120 drives the drive gear 122 in the second direction to rapidly move the receiving medium 26 in the direction of the arrow 28.

As should be appreciated, in various exemplary embodiments, various modifications to the receiving medium advancing system 100 of FIGS. 2–4 may be used. For example, in various exemplary embodiments, the drive gear 122 may directly engage both the first and second one-way clutches 160 and 230 to drivingly engage the first and second one-way clutches 160 and 230. Alternatively, the drive belts 150 and 200 may be replaced by one or more gears. Thus, it should be appreciated that any combination of mechanical elements that are capable of transmitting rotational and/or translational force to the shaft 110 may be used with the drive gear 122 and first and second one-way clutches 160 and 230 in order to provide a high speed advance subsystem when the drive gear 122 is rotated in one of the first and second directions and a high precision advance subsystem when the drive gear 122 is rotated in the other of the first and second directions.

While this invention has been described in conjunction with the exemplary embodiments described above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of advancing a receiving medium with a stepping mechanism including a motor, a motor gear connectable to the motor and rotatable by the motor, a first one-way clutch, a second one-way clutch and an output shaft connected to both the first one-way clutch and the second one-way clutch wherein the motor rotates the motor gear in a first direction so as to operate the output shaft via the first one-way clutch in a first mode to advance the receiving medium at a first speed and the motor rotates the motor gear in a second direction so as to operate the output shaft via the second one-way clutch in a second mode to advance the receiving medium at a second speed slower than a first speed, wherein the first and second one-way clutch do not operate at the same time, comprising:

driving the output shaft in the second mode when the receiving medium is approaching a printhead;

driving the output shaft in the first mode when printing occurs on the receiving medium; and driving the output shaft in the second mode after printing occurs on the receiving medium.

* * * * *